United States Patent

Otani et al.

[11] Patent Number: 5,109,244
[45] Date of Patent: Apr. 28, 1992

[54] ELECTRONIC FLASH APPARATUS FOR CAMERAS

[75] Inventors: Tadashi Otani, Yokohama; Toru Kosaka, Zama; Hiroshi Meguro, Kawasaki, all of Japan

[73] Assignee: Nikon Corporation, Tokyo, Japan

[21] Appl. No.: 618,537

[22] Filed: Nov. 27, 1990

Related U.S. Application Data

[60] Continuation of Ser. No. 553,583, Jul. 18, 1990, abandoned, which is a division of Ser. No. 312,333, Feb. 16, 1989, Pat. No. 4,969,007, which is a continuation of Ser. No. 168,482, Mar. 15, 1988, abandoned.

[30] Foreign Application Priority Data

Mar. 19, 1987 [JP] Japan .................. 62-65458
Mar. 19, 1987 [JP] Japan .................. 62-65459

[51] Int. Cl.⁵ .................. G03B 15/05; H05B 41/26
[52] U.S. Cl. .................. 354/127.11; 315/241 P; 315/136
[58] Field of Search ............ 354/413, 418, 484, 145.1, 354/127.1, 127.11, 127.12; 315/241 P, 129, 133, 136

[56] References Cited

U.S. PATENT DOCUMENTS

| | | | |
|---|---|---|---|
| 4,071,884 | 1/1978 | Maigret | 315/241 P X |
| 4,100,459 | 7/1978 | Nakamura et al. | 315/136 |
| 4,162,836 | 7/1979 | Harrison | 354/145.1 |
| 4,361,389 | 11/1982 | Monks et al. | 354/145.1 |
| 4,470,684 | 9/1984 | Harvey | 354/145.1 X |
| 4,519,683 | 5/1985 | Hagyuda et al. | 354/418 X |
| 4,692,582 | 9/1987 | Kawamura et al. | 354/145.1 X |

Primary Examiner—W. B. Perkey
Attorney, Agent, or Firm—Shapiro and Shapiro

[57] ABSTRACT

In a camera system including an electronic flash apparatus, a main capacitor of the flash apparatus is charged for a predetermined time interval, in response to a preparatory operation such as a first stroke of a release button. During this time interval, operation of an automatic distance measuring device, an automatic exposure controlling device and an object luminance discriminating circuit is prevented. A warning device warns a photographer that the main capacitor is insufficiently charged. Several voltage detectors detect different voltage levels of the main capacitor and produce detection signals for inhibiting the operation of the warning device and/or preventing further charging of the main capacitor.

8 Claims, 2 Drawing Sheets

ELECTRONIC FLASH APPARATUS FOR CAMERAS

This is a continuation of application Ser. No. 553,583 filed Jul. 18, 1990, now abandoned, which is a division of application Ser. No. 312,333 filed Feb. 16, 1989, now U.S. Pat. No. 4,969,007 issued Nov. 6, 1990, which is a continuation of application Ser. No. 168,482 filed Mar. 15, 1988, now abandoned.

BACKGROUND OF THE INVENTION

1. Field of the Invention

The present invention relates to an electronic flash apparatus which is incorporated into a camera or is externally connected to a camera.

In some conventional electronic flash apparatus a main capacitor of the flash apparatus is charged immediately after film has been fed or wound up. If flash photography is desired long after the film has been wound up, the voltage on the main capacitor may be insufficient for proper flash photography, and the main capacitor must be re-charged, such as by releasing a release button, before flash photography is possible.

SUMMARY OF THE INVENTION

An object of the present invention is to provide improved electronic flash apparatus, more particularly electronic flash apparatus comprising a control circuit that controls the charging of a main capacitor for a predetermined time interval in response to a first stroke of a release button of a camera. During the predetermined time interval, operation of an automatic distance measuring device, an automatic exposure controlling device and an object luminance discriminating circuit is prevented or blocked, thereby avoiding improper operation.

In accordance with one of the features of the invention, an alarm or warning device is provided for warning a photographer of the fact that the main capacitor is insufficiently charged. Several detector devices are provided for detecting different voltage levels of the main capacitor and for inhibiting the operation of the warning device and/or further charging of the main capacitor.

DESCRIPTION OF THE PREFERRED EMBODIMENTS

The present invention will now be fully explained with reference to the attached drawings.

Figure 1:
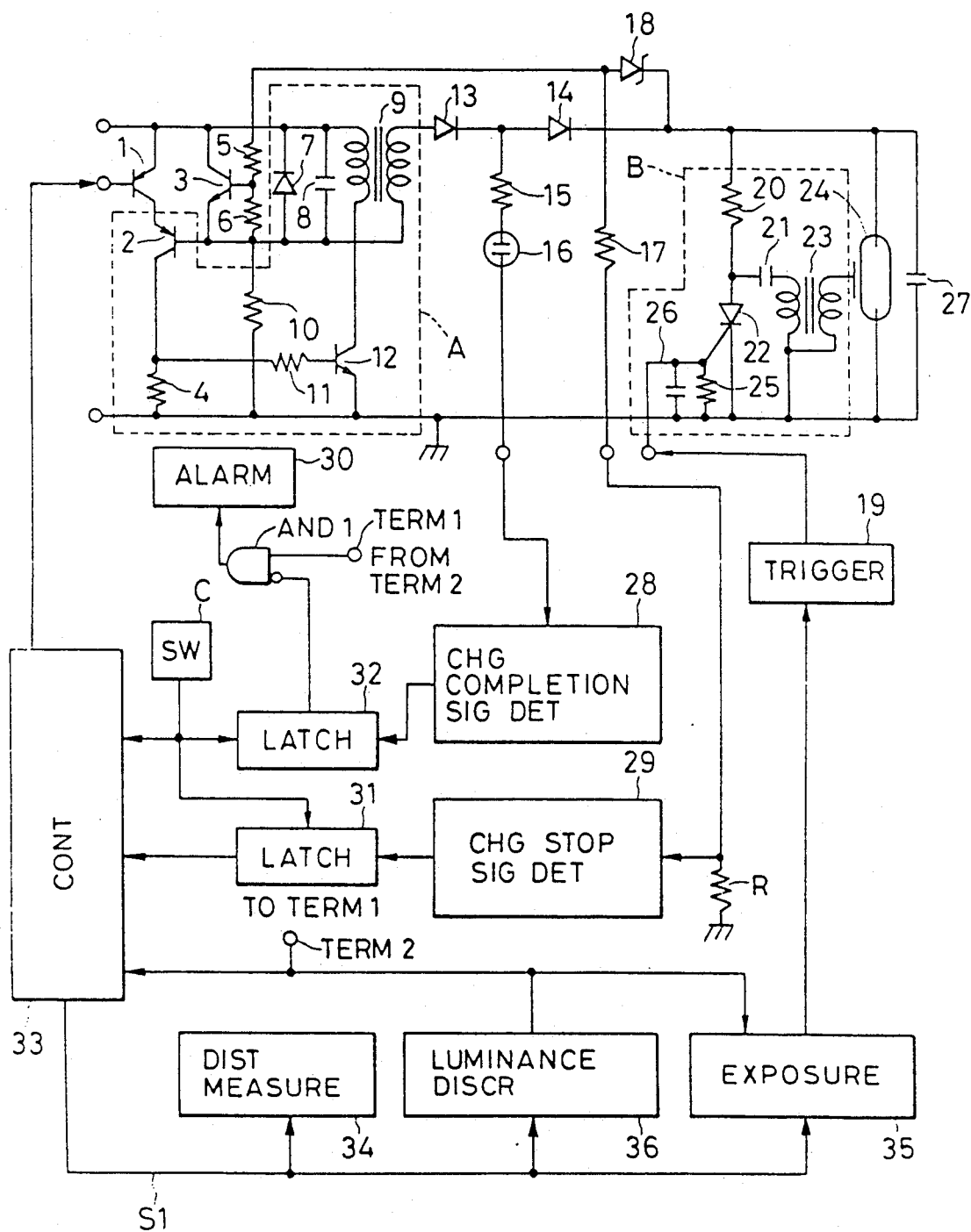
FIG. 1 is a circuit diagram of an electronic flash apparatus according to an embodiment of the present invention.

In FIG. 1 showing a preferred embodiment of the present invention, a PNP-type transistor 1 having an emitter connected to a positive common terminal constitutes an input element for an electronic flash charge controlling signal. An oscillation circuit -A is constituted by a PNP-type transistor 2 having an emitter connected to a collector of the transistor 1, an NPN-type transistor 12 connected to a collector of the transistor 2 through a resistor 11, a resistor 4 connected between the collector of the transistor 2 and an earth or ground, a resistor 10 connected beween a base of the transistor 2 and the earth, a diode 7 having a cathode connected to the positive common terminal and an anode connected to the base of transistor 2, a capacitor 8 connected between the positive common terminal and the base of the transistor 2, and a transformer 9 having a primary winding connected between the positive common terminal and the collector of the transistor 2 and a secondary winding connected between the base of the transistor 2 and an output terminal. A diode 13 having an anode connected to the output terminal of the oscillation circuit A is provided for rectifying an AC output in the secondary side of the boosting transformer 9.

A cathode of the diode 13 is connected to a positive plate of a main capacitor 27 and an anode of a discharge tube 24, respectively, through a leak preventing diode 14.

A trigger circuit B is constituted by a resistor 20, a trigger capacitor 21, a trigger coil 23, a thyristor 22, a resistor 25 and a capacitor 26. The trigger circuit B is energized by a signal generated by a trigger signal generating circuit 19.

A neon tube 16 acts as a charge completion voltage detecting element connected to the cathode of the diode 13 through a resistor 15. The neon tube 16 is connected to a charge completion signal detecting circuit 28, an output of which is connected to latch circuit 32. An output terminal of the latch circuit 32 is connected to one of input terminals of an AND gate (AND 1), an output terminal of which is connected to an alarm circuit 30.

The positive plate of the main capacitor 27 is connected, on one hand, to a resistor 17 and is connected, on the other hand, to a base resistor 5, through a Zener diode 18 acting as the charge completion voltage detecting element. The resistor 17 is connected to a charge stop signal detecting circuit 29 and is also connected to the earth through a resistor -R. An output of the charge stop signal detecting circuit 29 is connected to a latch circuit 31, an output of which is connected to a control circuit 33. The base resistor 5, a resistor 6 and the resistor 10 are connected to the Zener diode 18 in parallel with the resistor 17. The connecting point between the base resistor 5 and the resistor 6 is connected to a base of a transistor 3, an emitter of which is connected to the base of the transistor 2. The resistor 6 is also connected or inserted between the emitter and the base of the transistor 3 to prevent inadvertent operation of the transistor 3.

A signal S1 emitted from the control circuit 33 is sent to an automatic distance measuring device 34, an automatic exposure controlling circuit 35 and an object luminance discriminating circuit 36, respectively. If the brightness or luminance of the object is so low or small as to request flash photography, the object luminance discriminating circuit 36 sends a high level (referred to as "H" hereinafter) low-luminance signal to the control circuit 33 and to other input terminal (TERM 1) of the AND gate (AND 1). Latch circuit 32 latches an "H" signal in response to the output of the signal detecting circuit 28 changing from an "L" level to an "H" level. Latch circuit 31 latches an "H" signal in response to the output of charge stop signal detecting circuit 29 changing from an "L" level to an "H" level. The latches are released (latch circuits reset) during the first stage of operation of a two-stroke switch C.

All of the above-mentioned circuits can be driven by the same electric power source.

Figure 2:
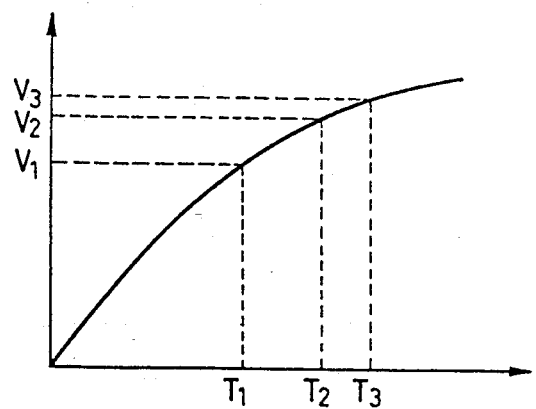
FIG. 2 is a graph showing a wave form of charge voltage in a main capacitor of the apparatus of FIG. 1.

Next, the operation of the electronic flash apparatus having the construction mentioned above will be explained with reference to FIGS. 1 to 3. FIG. 2 shows a relationship between the charge voltage of the main capacitor and the time, and FIG. 3 is a timing chart showing the sequence of operation of the camera.

Figure 3:
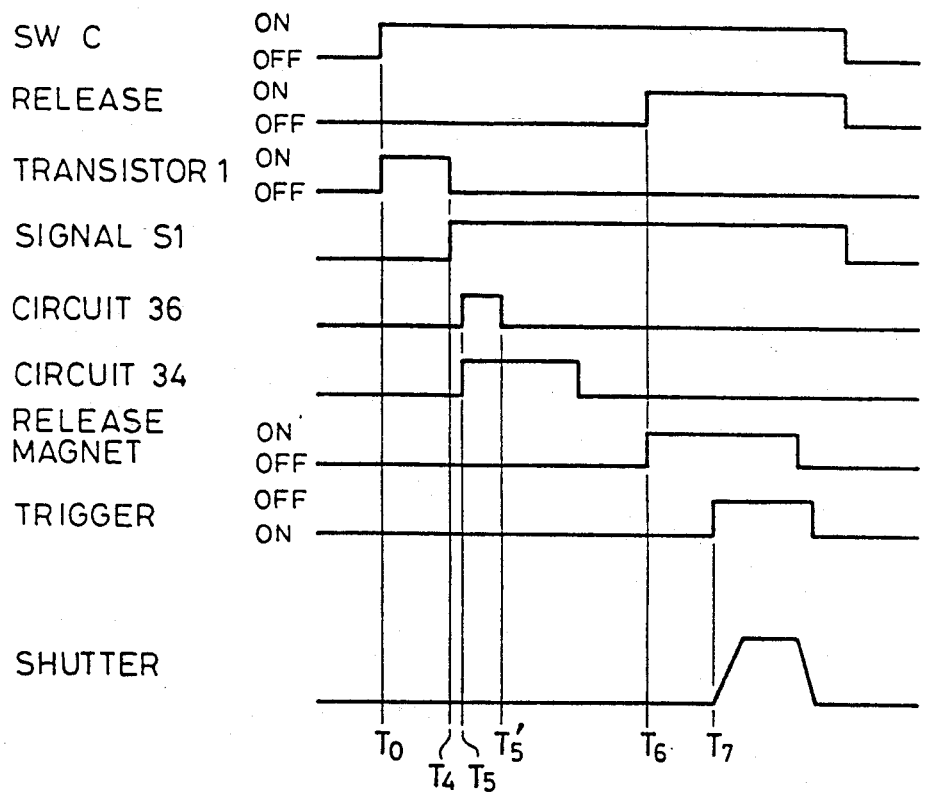
FIG. 3 is a timing chart for explaining the operation of the circuit of FIG. 1.

When the switch C is energized (ON state), a signal for energizing the transistor 1 (ON state) is outputted from control circuit 33 to transistor 1 for a predetermined time interval corresponding to one from time $T_0$ to $T_4$ shown in FIG. 3, with the result that the output signal from the oscillation circuit A charges the main capacitor 27 through the diode 13 and the diode 14. The latch circuits 31 and 32 are reset at the time $T_0$. It should be noted that the control circuit 33 has a construction already known per se in which it outputs a signal for energizing the transistor 1 in response to OFF state of the switch C; in addition it includes a timer (not shown) for outputting a signal for energizing the transistor 1 for a predetermined time interval in response to ON state of the switch C, regardless of the output of the latch circuit 31.

The cathode of the communicating diode 13 is connected, through the resistor 15, to the neon tube 16 acting as the charge completion voltage detecting element. When the charge voltage of the main capacitor 27 is lower than a voltage $V_1$ (FIG. 2) sufficient to initiate the flash photographing, the current does not flow through the neon tube 16, thus maintaining the signal of the charge completion signal detecting circuit 28 to "L". If the object luminance discriminating circuit 36 is outputting the "H" low-luminance signal, since the output of the charge completion signal latch circuit 32 is "L", the "H" signal is sent to the alarm circuit 30. The alarm circuit 30 is a circuit constituted in such a manner that it blocks a supplying signal to the shutter release magnet when the release switch is energized (ON state) at time $T_6$ shown in FIG. 3 and gives a warning by lighting a LED. The control circuit 33 maintains the signal S1 to "L" during the time interval ($T_0$-$T_4$) for charging the main capacitor 27, thus preventing the feed of current to the automatic distance measuring device 34, automatic exposure controlling circuit 35 and object luminance discriminating circuit 36.

When the two-stroke switch C is released, the charge to the main capacitor 27 is initiated. When the charge voltage charged in the main capacitor 27 reaches a voltage value $V_2$ shown in FIG. 2, a current flows through the diode 18; the current is detected by the charge stop signal detecting circuit 29 through the resistor 17, with the result that the output of this detecting circuit 29 is changed from "L" to "H". Consequently, the "H" output of the detecting circuit 29 is latched by the latch circuit 31; this latch circuit sends "H" signal to the control circuit 33. Thus, the transistor 1 is deenergized (OFF state) by the output of the control circuit 33, thereby stopping the oscillation of the oscillation circuit A. On the other hand, while the oscillation circuit A is being operated, the control circuit 33 is outputting the feed inhibiting (preventing) signal to the automatic distance measuring device 34, automatic exposure controlling circuit 35 and object luminance discriminating circuit 36.

When the two-stroke switch C is energized again, the main capacitor 27 is charged again for the predetermined time interval. When the charge voltage in the main capacitor 27 becomes higher than the voltage value $V_1$ (FIG. 2) and a detecting signal flows through the neon tube 16 (FIG. 1), the output of the charge completion signal detecting circuit 28 is latched by the latch circuit 32 as a charge completion "H" signal.

When the charge to the main capacitor 27 for the predetermined time interval ($T_0$-$T_4$) is completed ($T_4$ in FIG. 3), the signal S1 is changed to "H", with the result that currents are fed to the automatic distance measuring device 34, automatic exposure controlling circuit 35 and object luminance discriminating circuit 36, respectively. At time $T_5$ when the voltage applied to each of the circuits is stabilized, the object luminance discriminating circuit 36 and the automatic distance measuring device 34 are initiated or operated; when the operation of the discriminating circuit 36 and the measuring device 34 is completed, luminance data and measured distance data are latched.

When the release switch is energized (ON state) at time $T_6$ in FIG. 3, the release magnet is energized, thus initiating magnetic release operation. Then, at time $T_7$, the opening of the shutter blades is initiated and at the same time the trigger switch is deenergized (OFF state). In this circumstance, the automatic exposure controlling circuit 35 has already latched the output of the object luminance discriminating circuit 36 in the time interval between $T_5$ and $T_5'$. Therefore, if the output of the discriminating circuit 36 is "H", the automatic exposure controlling circuit 35 performs an operation regarding the time interval required for flash illumination and regarding trigger timing; the resultant signal is sent to the trigger signal generating circuit 19; the trigger signal from the trigger signal generating circuit 19 is sent to the trigger circuit B, thus illuminating the discharge tube 24. Further, the automatic exposure controlling circuit 35, when the operated flash illumination time interval has elapsed, deenergizes the release electromagnet, thereby closing the shutter.

On the other hand, when the object luminance discriminating circuit 36 discriminates or judges the high-luminance of the object, the automatic exposure controlling circuit 35 controls the exposure in response to the brightness of the object. Preferably, the control circuit 33 is so constructed that it initiates the film take-up operation and the charging of the main capacitor 27 after the exposure operation is completed, regardless of the illumination of the discharge tube. Also, in this case, the main capacitor 27 is charged until the charge voltage in the main capacitor reaches the voltage value $V_2$ in FIG. 2.

Next, the role of the transistor 3 will be explained. In the electronic flash apparatus, the control circuit 33 and the charge stop signal detecting circuit 29 and the like are generally constructed as a single integrated circuit (IC circuit) independent from the oscillation circuit A and the trigger circuit B, and such IC circuit is electrically connected to said control circuit and trigger circuit, respectively, by soldering. If the charge stop signal detecting circuit 29 is disconnected from the resistor 17 due to breaking of wire and the like, the charging operation to the main capacitor 27 cannot be stopped, thus damaging the main capacitor The transistor 3 acts as means for preventing the damage of the main capacitor.

When the charge voltage in the main capacitor 27 reaches a voltage value $V_3$ in FIG. 2, the current flowing through the Zener diode 18 is increased, thus energizing the transistor 3 (ON state) through the resistor 5. When the transistor 3 is energized, the voltage between the base and the emitter of the transistor 2 is decreased to zero to deenergize transistor 2 (OFF state), thus stopping the oscillation of the oscillation circuit A, with the result that the charging to the main capacitor 27 is also stopped, thereby preventing the damage thereof.

Figure 4:
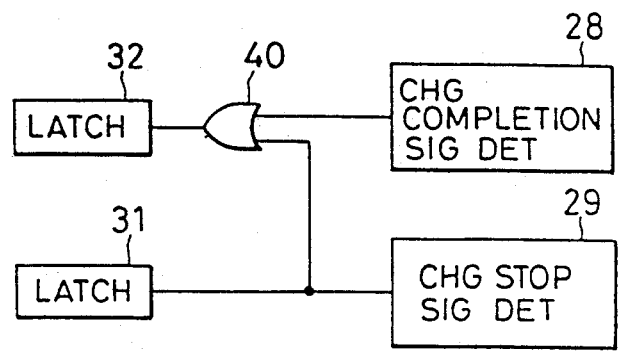
FIG. 4 is a block diagram showing a modification of the present invention.

FIG. 4 shows a modification of the present invention. The electronic flash apparatus shown in FIG. 4 differs from that of FIG. 1 in the following point. That is to say, in the flash apparatus shown in FIG. 4, both the charge completion signal detecting circuit 28 and the charge stop signal detecting circuit 29 are connected to the latch circuit 32 through an OR gate 40. For example, when the ON and OFF of the switch C is repeated, even if there is no breaking of wire in the circuits, the voltage in the main capacitor 27 may reach the voltage value $V_3$, thereby energizing the transistor 3 (ON state) thus deenergizing the transistor 2 (OFF state) to stop the oscillation circuit A. In the embodiment of FIG. 1, if the oscillation circuit A is stopped, the current cannot be fed to the neon tube 16, with the result that the alarm circuit 30 is energized, thus locking the shutter release. However, in the modification shown in FIG. 4, since the fact that the charge voltage in the main capacitor 27 exceeds the voltage value $V_2$ is detected by the charge stop signal detecting circuit 29 and the "H" signal is inputted to the latch circuit 32, there is no shutter release lock.

Instead of energizing switch C by a first stroke, a plurality of touch sensors may be arranged around the release button to energize the switch C (ON state) when the operator touches any of the touch sensors.

As mentioned above, according to the present invention, since the operation of the object luminance discriminating circuit as in the case of automatic illumination is performed after the charging to the main capacitor is completed, the erroneous operation of the object luminance discriminating circuit due to charge noise of the main capacitor is prevented. Further, since there is no provision of leak preventing switching elements for discriminating the charge completion, a cheaper apparatus can be obtained.

I claim:

1. A camera system comprising:
(a) flash means for generating flash illumination toward an object, the flash means including capacitor means and means for charging the capacitor means;
(b) first detecting means for detecting the fact that a voltage generated by electric charge stored in said capacitor means reaches a first voltage level, to produce a first detecting signal;
(c) warning means for warning a photographer of the face that said capacitor means fails to store a quantity of electric charge capable of generating flash illumination, the warning means stopping the warning in response to said first detecting signal;
(d) second detecting means for detecting the fact that a voltage generated by electric charge stored in said capacitor means reaches a second voltage level greater than said first voltage level, to produce a second detecting signal;
(e) charge prohibiting means responsive to said second detecting signal for prohibiting said charging means from charging said capacitor means; and
(f) warning prohibiting means responsive to said second detecting signal for prohibiting said warning means from warning said photographer.

2. A camera system comprising:
(a) flash means for generating flash illumination toward an object, the flash means including capacitor means and means for charging said capacitor means;
(b) first detecting means operable during the charging of said capacitor means for detecting the fact that the voltage generated by electric charge stored in said capacitor means has reached a first voltage level;
(c) warning means for warning a photographer of the fact that said capacitor means fails to store a quantity of electric charge capable of generating flash illumination, the warning means stopping said warning in response to said first detecting signal;
(d) second detecting means for detecting the fact that a voltage generated by the electric charge stored in said capacitor means has reached a second voltage level higher than said first voltage level, to produce a second detecting signal;
(e) first charge prohibiting means responsive to said second detecting a signal for prohibiting said charging means from charging said capacitor means;
(f) third detecting means for detecting the fact that a voltage generated by electric charge stored in said capacitor means has reached a third voltage level higher than said second voltage level, to produce a third detecting signal;
(g) second charge prohibiting means responsive to said third detecting signal for prohibiting said charging means from charging said capacitor means; and
(h) warning prohibiting means responsive to said second detecting signal for prohibiting said warning means from warning said photographer when said second charge prohibiting means prohibits the charging of said capacitor means by said charging means.

3. Apparatus for controlling charging of a main capacitor of a flash device which generates flash illumination toward an object, comprising:
a) charging means for charging said main capacitor;
b) first inhibiting means for inhibiting said charging means from charging said main capacitor when said main capacitor has been charged to a first predetermined voltage; and
c) second inhibiting means operable for inhibiting said charging means from charging said main capacitor when said first inhibiting means fails to inhibit said charging means from charging said main capacitor and when said main capacitor has been charged to a second predetermined voltage higher than said first predetermined voltage.

4. Apparatus according to claim 3, wherein said apparatus includes control means having conductivity dependent upon the voltage to which said main capacitor is charged for causing said first inhibiting means to inhibit said charging means from charging said main capacitor when said main capacitor has been charged to said first predetermined voltage.

5. Apparatus according to claim 4, wherein said control means causes said second inhibiting means to inhibit said charging means from charging said main capacitor when said main capacitor has been charged to said second predetermined voltage.

6. Apparatus for controlling charging of a main capacitor of flash means which generated flash illumination toward an object, comprising:
   a) charging means for charging said main capacitor;
   b) a voltage-responsive element that becomes conductive so that current flows therethrough when voltage applied to said element is over a first predetermined value, said element being connected to said main capacitor so that the voltage applied to said element depends upon the charging of said main capacitor;
   c) first inhibiting means for inhibiting said charging means from charging said main capacitor when said element becomes conductive; and
   d) second inhibiting means for inhibiting said charging means from charging said main capacitor on the basis of the amount of current flowing through said element when voltage of said main capacitor is over a second predetermined value which is higher than said first predetermined value.

7. A device according to claim 6, wherein said element is a Zener diode, wherein said second inhibiting means is a transistor, and wherein a control terminal of said transistor is electrically connected to an anode of said Zener diode.

8. A device according to claim 6, wherein said transistor is conductive when voltage of said main capacitor is over said second predetermined value.

* * * * *